Figure 1:
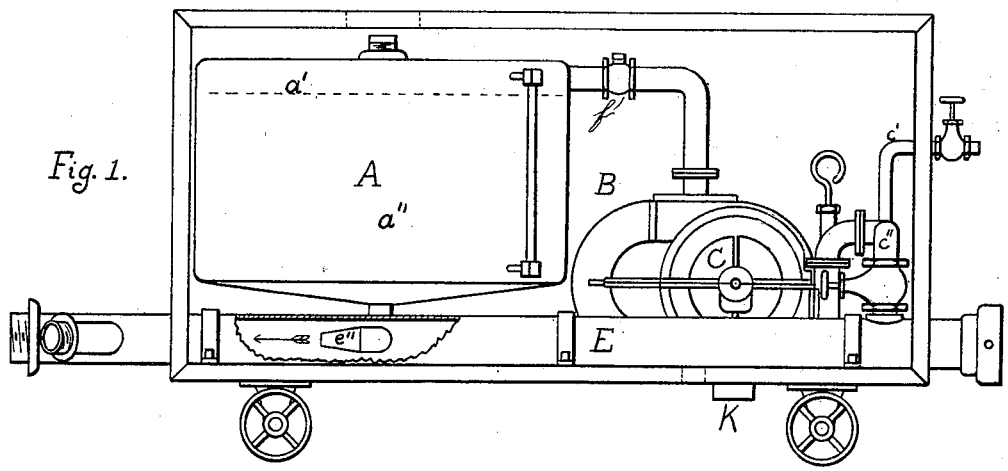

No. 651,102. Patented June 5, 1900.
F. M. F. CAZIN.
CHEMICALIZING FIRE ENGINE ANNEX.
(Application filed June 26, 1897.)
(No Model.) 2 Sheets—Sheet 1.

WITNESSES:
J. R. Vandyck
J. J. Crain.

INVENTOR
Francis M. F. Cazin

No. 651,102. Patented June 5, 1900.
F. M. F. CAZIN.
CHEMICALIZING FIRE ENGINE ANNEX.
(Application filed June 26, 1897.)
(No Model.) 2 Sheets—Sheet 2.
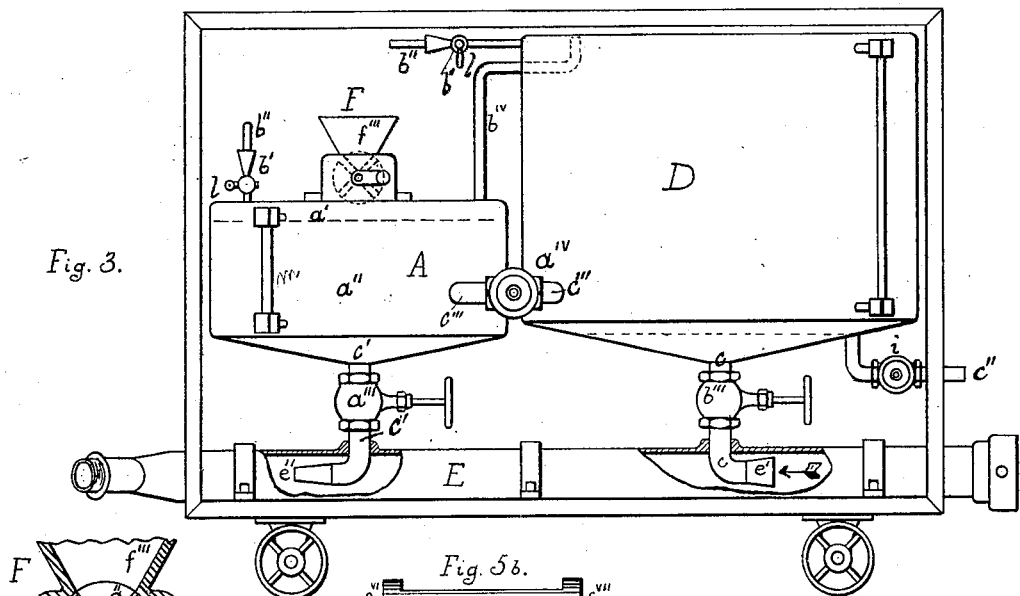
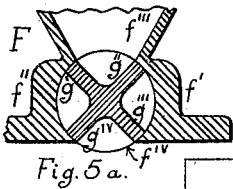
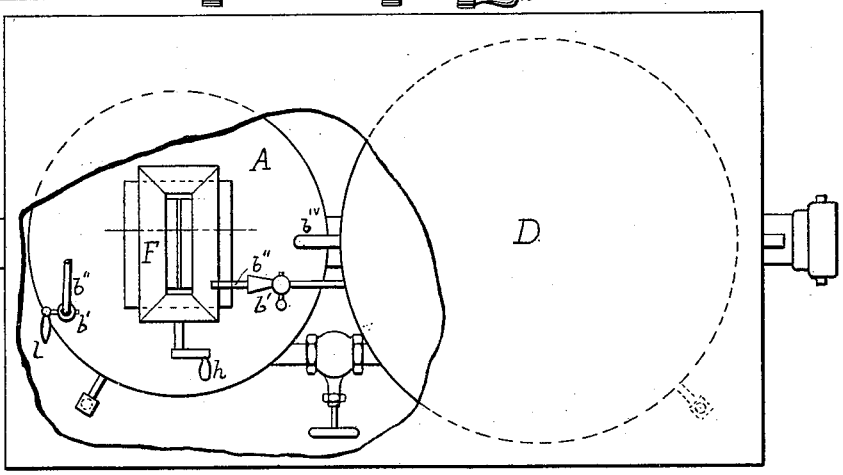
WITNESSES:
J. R. Vandyck
J. J. Crain.
INVENTOR
Francis M. F. Cazin

UNITED STATES PATENT OFFICE.

FRANCIS M. F. CAZIN, OF HOBOKEN, NEW JERSEY.

CHEMICALIZING FIRE-ENGINE ANNEX.

SPECIFICATION forming part of Letters Patent No. 651,102, dated June 5, 1900.

Application filed June 26, 1897. Serial No. 642,430. (No model.)

*To all whom it may concern:*

Be it known that I, FRANCIS M. F. CAZIN, a citizen of the United States, residing at the city of Hoboken, county of Hudson, State of New Jersey, have invented a new and useful Apparatus to Serve as a Chemicalizing Fire-Engine Annex, of which the following is a specification.

It has long been known that the salt ammonia carbonate, an article of commerce, when heated to 58° centigrade by coming into contact with burning matter will dissociate into its gaseous components—carbon dioxid and ammonia—that the gaseous matter so produced, forming an atmosphere in immediate contact with the burning matter, protects the same against contact with the oxygen of the air, and that this is the means of speedily causing cessation of combustion; and advantage has been taken of this knowledge in dissolving such ammonium carbonate, only worth a few cents per pound, and in projecting the solution, contained in fragile vessels of various forms, into burning masses for the purpose of terminating combustion; and advantage has also been taken of the stated knowledge in the other way of mixing such a solution with the water that is being ejected from the hose of a fire-engine, such mixing being in one case performed by a pump which has a suction connection with a vessel containing the solution which has previous to its introduction into the said vessel been prepared and which pump has an ejecting connection with the ejecting-hose of a fire-engine, and the said pump has been driven by the force of the water obtained from the hose of a fire-engine.

My improvement on the apparatus such as described consists, in the first place and materially, in discomplicating the apparatus in its construction and in its working in sundry ways. I have achieved this to the extent of discarding a pump altogether as the means of manipulating the chemicals in solution or any part of the water used in my apparatus.

Provision is made in my apparatus for separate introduction of solid chemicals and of water and for thereby producing the solution and for doing this in a continuous or uninterrupted action; and my apparatus has further provision for using not only the water from the ejecting-hose of a fire-engine as the medium of power conveyance, but for using also any other motive fluid that the fire-engine to which my apparatus is an annex may produce.

To avoid the inconvenience that results from incrustations in the channels and valves which form the accessories of a pump, I do not pass the solution of solid chemicals through any pumping operation at all and do not handle the solution at all, except to cause it to directly enter the section of the fire-engine ejecting-tube which forms a part of my apparatus and is placed directly below and connected with the vessel containing the solution; and I render this avoidance of difficult and impracticable handling possible by separately bringing the components of the solution into the apparatus and by using pressure by means of air or steam, or both, directly on the surface of the solution for the purpose of injecting the solution directly into the fire hose or tube section.

I desire it to be well understood that my apparatus is not in itself a power-producing apparatus for ejection of water or of any other matter unto burning objects—in other words, that it is not a fire-engine proper, but only an accessory or annex thereto or to any other apparatus for ejecting water with force. My apparatus is therefore made dependent on the use of some motive fluid that comes from the fire-engine proper, to which it is used as an accessory or annex; but it may use directly or indirectly any motive fluid so produced as medium of power conveyance and by means of which I can produce directly or intermediately pressure on the surface of the liquid—viz., by means of blowing in air or compressing air, or by ejecting steam or steam and air conjointly, or other vapors or gases the expansion of which is produced by fire, the only essential condition being that the fire-engine proper furnish some power-conveying motive fluid to my apparatus as the means of producing pressure in some suitable manner on the surface of the solution, which by such air or steam pressure is to be ejected from a vessel containing the same into a section of the ejecting tube or hose of or to the said fire-engine.

While I have mentioned the fire-engine proper as the source of power for operating my apparatus, it is self-evident that water under pressure or in gravitation available from any other source than a fire-engine with sufficient power to be ejected unto the burning object may be used as well as the water which comes by way of a fire-engine; and it is further self-evident that steam or compressed air coming from any other boiler or reservoir, if of sufficient pressure, may be used in my apparatus conjointly with the water coming by any other way than the fire-engine proper.

I further desire it to be understood that I do not use in my supplementary apparatus or annex any chemical reaction or compounding, but use solid chemicals of commerce, such as ammonium carbonate, dissolved or suspended in water, called by me herein "solution," and that I form this solution in my apparatus and eject it continuously by the power, as hereabove specified, into the current of water ejected for the purpose of extinguishing conflagration, using such current as the means of conveyance of the chemicals that have fire-extinguishing qualities unto the burning objects and producing thereby the gases which have the qualities, as stated, by means of the heat emanating from the burning matter.

I render my supplementary apparatus continuous in its operation by supplying to it, continuously or at intervals, as may be required of the different materials, water and chemicals, water and air and chemicals, water and steam and chemicals, or water, air, steam, and chemicals and by ejecting continuously or at intervals "solution," so called, into the hose-section, as hereinabove mentioned.

My main reliance is on using the following parts, be it all together or in such selection thereof as may answer my purpose under special conditions, namely: first, a section in or of the ejecting-hose of a power-producing fire-engine; second, a closed vessel intended to contain a solution of chemicals that have fire-extinguishing qualities, which vessel is adapted to the application inside thereof of greater pressure than that of the atmosphere and to preparing therein by continuous or intermittent feeding the aforesaid solution; third, suitable parts for feeding the said vessel with water; fourth, suitable parts for ejecting into the said vessel, directly or intermediately, an extra supply of air or of steam, or of both, and for escape of such injected fluid; fifth, connections for organizing the parts into an organized whole adapted for its intended functions, such as pipes, valves, belts, and gearings; sixth, a power-wheel; seventh, reserve parts and reserve connections—as, for instance, a reserve vessel—such being not essential, but a matter of more or less convenience and capacity, and, eighth, a feeding apparatus for the main vessel and suitable mechanism for operating the same.

Any suitable method may be applied for producing pressure on the surface of the solution by such means as at all applicable when a pressure fluid or a motive fluid is provided from the fire-engine proper, while the by me preferred method consists in introducing from outside of my apparatus air or steam, or both, into the space above the solution and within the main vessel at suitable intervals, and thus cause pressure on and consequent ejection of the solution. In indirect application the motive fluid may be used for driving a rotary or reciprocating air-pump or air-compressor, which driving may be performed by such accessories as a power-wheel for the use of steam or water, and the above-stated connections may be directly with the main vessel that contains the solution or they may be by way of a supplementary reserve vessel. That which I believe to be an essentially new and improved feature in my apparatus as against that which now is known to the art consists in this that I inject air and steam into the solution vessel and above the surface of the solution, that I use other power or pressure than that of the atmosphere and of the water that is being ejected, and that I use alternate diminution of pressure in sundry ways, and, further, consists in the combination of means that I use to bring this about and in their substitution for one another. This does not mean that I claim invention in any single one of the mechanical parts. My invention as to means applied consists in new combinations of known parts for the stated purpose that is made instrumental to a useful effect.

The different parts as specified and as shown in my drawings may be set to use for producing the effect of injecting air by power applied from outside into the closed solution vessel, and thereby ejecting solution into the hose-section, and may be given a place in the apparatus, or a selection of them only may find place therein, as is shown in Figs. 3 and 4 of my drawings, thereby discomplicating the same. It nevertheless is evident that the embodiment of parts that substitute one another in one and the same apparatus, forming an organic whole, will make a better apparatus for its important purpose, where a failure of any isolated part to functionate might take the shape of a calamity. It is evident that in coördinating around one and the same solution vessel more than one of the devices for creating air-pressure within the said vessel they may be set to action singly or jointly. In case of one such device losing tension another may begin to work. Substituting devices in the same apparatus may, moreover, provide opportunities for repairing one while the other operates.

It is essential to my apparatus that there be in it, first, the described hose-section; second, the solution vessel; third, the part or parts injecting air or steam, or both, by power derived from another source than atmospheric pressure into the vessel; fourth, the pipes and valves for suitable connections and regulation of water, air, and eventually steam; fifth, the suitable mechanical parts to produce, communicate, and regulate the necessary movements of moving parts, and, sixth, the air-tight feeder or disintegrated solid chemicals on top of the solution vessel.

My apparatus is not primarily intended to be set up in a stable position, but is intended to be mobile, like the fire-engine of common use, and to accompany the same and to supplement and improve its action to the effect of increasing its efficiency, but may nevertheless be used either stable in position or mobile.

Figure 2:
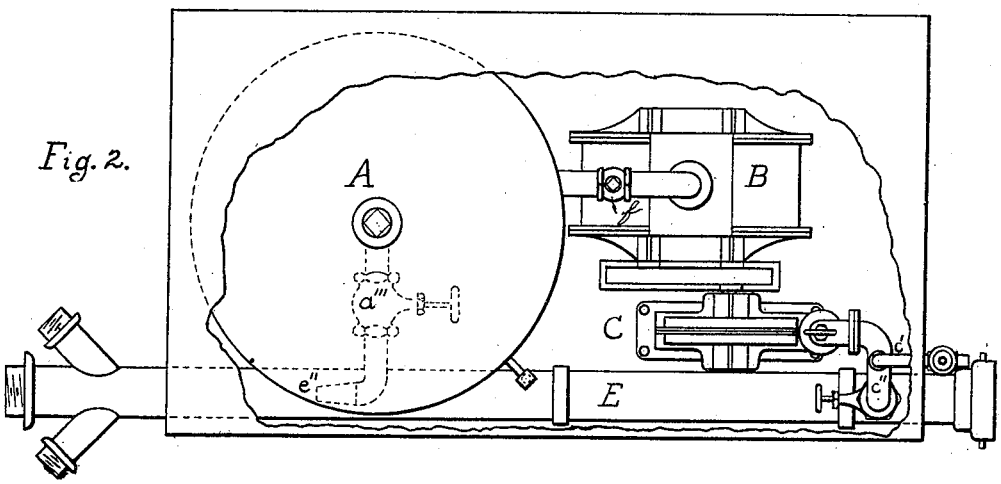

In the accompanying drawings, in which identical letters designate identical parts, Figure 1 is an elevation of my improved apparatus, of which an impulse power-wheel and a rotary air-compressor are parts. Fig. 2 is a plan of the same apparatus as shown in Fig. 1. Fig. 3 is an elevation of my apparatus with an extra or reserve vessel and other suitable means for air-injecting. Fig. 4 is a plan of the apparatus as shown in Fig. 3. Fig. $5^a$ is an enlarged section of the feeding-funnel for powdered solid matter, with its valve, being part of the apparatus as shown in Figs. 3 and 4. Fig. $5^b$ is a view of the inner part of the feeding-valve, the view being from above when the valve stands in the position where the new supply can be fed and the supply in the recess directly below is discharged into the vessel.

Whenever it is necessary for the operation of my apparatus, I inject the air above the surface of the solution and into the closed vessel A, and thereby provide for the necessary pressure for driving the solution into the hose-section E directly below the solution vessel in sundry ways, though all to the same purpose. Of these different ways I shall now disclose four, namely:

First. I use a rotary blower or air-compressor B, which is driven by an impulse power-wheel C, set on one of the two shafts of the air-compressor B, and the impulse-wheel in its turn is driven either by steam from the fire-engine by means of the pipe $c^4$ or by water from the ejecting-hose of the fire-engine by means of the pipe $c^5$, each of these pipes having its own throttle-valve.

Second. I use an extra air and water vessel D in connection with the main vessel A, the latter containing the solution. By allowing the water from the hose-section E to enter by the pipe $c\ c$ and the valve $b'''$ into the larger vessel D, with an open connecting-pipe $b^{iv}$ between the vessel D and the vessel A, the air above the water in the vessel D and above the solution in the vessel A will be compressed with the force of the current of water in the hose-section E. Without other provision to the end of causing further inflow by $c\ c$ and $b'''$ after such compression of air, and though the pipe $c'\ c'$ and valve $a'''$ be also open, no further inflow would take place; but I provide for further inflow by $c\ c$ and outflow by $c'\ c'$ in the different mouthpieces for these two pipes, and I foster this result by making the vessel D larger than the vessel A and by providing a further connection between the two vessels by the pipe $c'''\ c'''$ and the valve $a^{iv}$ at so low a level that water may pass freely from one vessel to the other. The kinetic energy or force of current of water coming from the fire-engine through the hose-section E when connected with or inserted into the ejecting-hose of such fire-engine and passing the hose-section E in the direction, as indicated by the arrow, toward the enlarged mouthpiece $e'$ of the pipe $c$ has the tendency to cause part of the water-current to enter into the enlarged opposing mouthpiece $e'$ and to drive such part farther on into the vessel D. On the other hand, the movement or the velocity of the same water-current has not the same effect on the other smaller mouthpiece $e''$ of the pipe $c'$. By this mouthpiece $e''$ the contents of the vessel A (the solution) may evacuate for want of resistance into the hose-section E by means of the pipe $c'$, the reduction in section of aperture serving to regulate or limit the quantity of such evacuation. The valves $a'''$, $a^{iv}$, and $b'''$ and $f$ are intended to control the action of the apparatus inasmuch as they may start and intercept such action.

Third. I cause the additional pressure on the surface $a'$ of the solution $a''$ in the vessel A by injecting steam and air into the upper part of either the vessel A or the vessel D, or of both, using the steam from the boiler of the fire-engine for such purpose. As means for such injection I have shown in Figs. 3 and 4 a cock $l$ and a part of the steam-pipe $b''$.

Fourth. The fourth means applied for the final purpose of causing flow of solution into the hose-section E is different in character from that which has been previously shown, the same as pulling is from pushing, the produced direction of motion being the same. A higher density of the solution $a''$ than that of the water in the hose-section E will cause the solution to sink to a certain extent into the water below, and surely so when the density of water coming in by the pipe $c'''$ is continuously increased by feeding soluble solid chemicals or powdered solid chemicals to such incoming water, thereby changing it to the solution, as hereinabove described.

Subordinate or coördinate to any of these four methods of causing ejection from the solution vessel into the hose-section is the release of the pressure on the surface of the solution or of the water in any one or all of the closed vessels employed to allow water to enter the same from the hose-section by means of the pressure of the current that passes through such section. Such release is effected by opening the cock $l$, (shown on the different vessels,) the gage-glasses $m$, also shown on these vessels, serving the purpose of making known the line between water and air at the different stages of the operation.

It is necessary and avoids objectionable complication, and, in fact, it is impracticable to illustrate in drawings all or most of the different methods of grouping the cited means for the stated purpose, it being well understood which of the parts are essential as such and which may substitute one another, which may be preferably duplicated and which not.

Having now disclosed the sundry means by me employed for injecting air or steam, or both, into the vessel from which the stated solution is to be ejected into a fire-engine hose-section, it remains to explain the operation of the new and improved apparatus for extinguishing combustion.

In the simplest form of my apparatus, as illustrated by Figs. 1 and 2, it is self-evident that the sole connection by $e''$ between the vessel A and the hose-section E must serve for both purposes of letting water enter and solution escape. To bring this about, the wind-cock $f$ is alternately shut and opened—namely, shut when the air-cock $l$ (shown in Figs. 3 and 4) is open, and opened when the air-cock $l$ is shut.

A peculiar form has been given to the feeding apparatus F, as shown in Figs. $5^a$ and $5^b$. While I do not exclude the feeding of the solution in ready-made fashion, having indicated such eventual intention by making a pipe connection on top of the vessel A in substitution of the feeder F, I prefer preparing the solution in the vessel A. Therefore I may have a vessel A with a feeder of solids or one with an aperture for pipe connection to receive ready-made solution, both of which arrangements I show in my drawings. That which has been said hereinabove of the benefit derived from a higher density of the solution is equally true when the powdered chemicals are wholly or in part suspended but undissolved in the water, their tendency then being to settle to the lowest part of the vessel A and into the section E. Stirring therefore need not be provided for. The feeder F, as shown, consists of three main parts—namely, the housing $f'\ f'''$, which fits air-tight to the ends $f^{vi}$ and $f^{vii}$, of circular form, and to the outer faces of the ribs $g'$, $g''$, $g'''$, and $g^{iv}$ of the cylindrical part, (shown in Fig. $5^b$,) which is intended to revolve in the said housing and which, in its recesses between ribs and ends, provides for space, in which the disintegrated chemicals can be conveyed from the exterior of the apparatus to its interior, without relieving the air-pressure inside of the vessel A. These recesses between the ribs may successively be filled when in the uppermost position and be emptied (without communication between the atmosphere and the inside of the vessel A being established) by turning the crank $h$. In showing this crank only as the means of operating the valve $5^b$ applicant does not waive any obvious selection or use of any other means known to the art and in common unprivileged use for connecting its moving parts, but waives all claim to inventing such parts or their use in the stated combination. Feeding the recesses $g'\ g''\ g'''\ g^{iv}$ of the revolving cylinder is done by the funnel $f''''$, the dimensions of which are determined by the rate of feeding, as intended, ample supply of chemicals by suitable means to be provided to keep the apparatus in prolonged operation, as the occasion may demand, and it should also be understood that the feeding apparatus, such as described, performs incidentally the other function of conveying at intervals corresponding to the emptied recesses being turned from the inside of the solution vessel to its outside portions of compressed air from inside to the outside of the solution vessel, thereby causing temporary relaxation of air-pressure and consequent inflow of water at intervals. The escape of the portions of compressed air through the disintegrated chemicals keeps them in active motion, preventing stagnation, and thus aids in the function of feeding, and the volume of these portions is suitably regulated by the dimensions of the recesses.

Having described my invention, I claim—

1. The combination with a section of hose or tube, which is to be inserted in the ejecting-hose of a fire-extinguishing apparatus, of a closed vessel, that contains a solution which has fire-extinguishing qualities, of an air-compressor and of a power-wheel, driving the said air-compressor, as and for the purposes set forth.

2. The combination with a section of hose or tube, which is to be inserted in the ejecting-hose of a fire-extinguishing apparatus, of a closed vessel, that contains a solution which has fire-extinguishing qualities, and of mechanical means, by which air is injected by mechanical force into the said closed vessel, as and for the purpose set forth.

3. The combination with a section of hose or tube, which is to be inserted in the ejecting-hose of a fire-extinguishing apparatus, of a closed vessel, that contains a solution, which has fire-extinguishing qualities, and of an air and steam injector, by which air and steam are injected into the said closed vessel, as and for the purpose set forth.

4. The combination with a section of hose or tube, which is to be inserted in the ejecting-hose of a fire-extinguishing apparatus, of a closed vessel, that contains a solution, which has fire-extinguishing qualities, of suitable means for injecting air or steam and air by force originating outside of the combination, and other than that of the atmosphere, into the said vessel, and of an air-escape cock or valve on the said vessel, as and for the purpose, as set forth.

5. The combination with a section of hose or tube, which is to be inserted in the ejecting-hose of a fire-extinguishing apparatus, of a closed vessel, that contains a solution, which has fire-extinguishing qualities, of suitable means for injecting by force other than atmospheric pressure, but originating outside of the combination, air or steam or both into the said vessel, of an air-escape cock or valve on the said vessel, and of an air-tight feeder of disintegrated solid matter on top of the said vessel, as and for the purpose, as set forth.

6. The combination with a section of hose or tube which is to be inserted in the ejecting-hose of a fire-extinguishing apparatus, of a closed vessel, that contains a solution, which has fire-extinguishing qualities, of a closed vessel, that contains water and air, of pipe connections between the said section of hose and each of these vessels, the hose-section having inside mouthpieces to the connection-pipes, of which mouthpieces the one leading from the hose-section, faces in opposition to the water-current, passing through the said hose-section, and the other of which leading from the solution vessel into the hose-section has a mouthpiece, which faces with the water-current, passing through the said hose-section, and of valves in the said connection-pipes, which control the current within such connections, as and for the purpose, as set forth.

7. The combination with a section of hose or tube, which is to be inserted in the ejecting-hose of a fire-extinguishing apparatus, of a closed vessel, that contains a solution, which has fire-extinguishing qualities, of an extra or reserve vessel, containing water and air, and of suitable means for injecting air or steam or both into either or both of these vessels by force, other than atmospheric pressure, but originating outside of the combination, as and for the purpose set forth.

8. In a fire-extinguishing apparatus, which, as such, originates no force fluid, and of which apparatus a section of hose or tube is a part, through which water is ejected by a force, that is not produced in the apparatus, vessels, suitably connected with one another, of which one contains a solution, which has fire-extinguishing qualities, and of which another contains water and air, that, which contains the solution, standing directly above the said section of the hose, and ejecting directly from above and not intermediately into the said hose-section, connecting pipes and valves, between the said hose-section and the vessels, and inside of said hose-section, a mouthpiece to each of the connecting-pipes, one of which mouthpieces, namely the one leading from the hose-section, has a wider opening, that faces against the water-current, and the other, namely the one leading from the solution vessel, a narrower opening that faces in the same direction, as the water-current moves within the said hose-section, as and for the purpose set forth.

9. In a fire-extinguishing apparatus, which itself produces no motive fluid, but which is dependent for any force or power, employed in its operation, on a force-supply from outside, and of which a section of hose or tube, by which water is ejected with force, is a part, a number of vessels suitably connected with one another, one of which vessels is filled with a solution, which has fire-extinguishing properties, and which vessel stands directly above the said hose-section, ejecting thereinto directly and not intermediately, connecting-valves between the said hose-section and the said vessels, and mouthpieces inside of said section to these pipes, the mouthpiece ejecting from the solution vessel facing with the current in the hose-section, and being smaller than the other mouthpiece, which faces against the direction of the water-current's movement within the said hose-section, a feeder of disintegrated solid matter to the solution vessel, which feeder has circular ends and has ribs and has an air-tightly-fitting housing, and has a funnel above, and suitable pipe, valve and other connections between the sundry parts, which connections are each of the suitable kind for the performance of the apparatus, as and for the purpose set forth.

FRANCIS M. F. CAZIN.

Witnesses:
J. R. VANDYCK,
J. J. CRAIN.